United States Patent Office 3,285,297
Patented Nov. 15, 1966

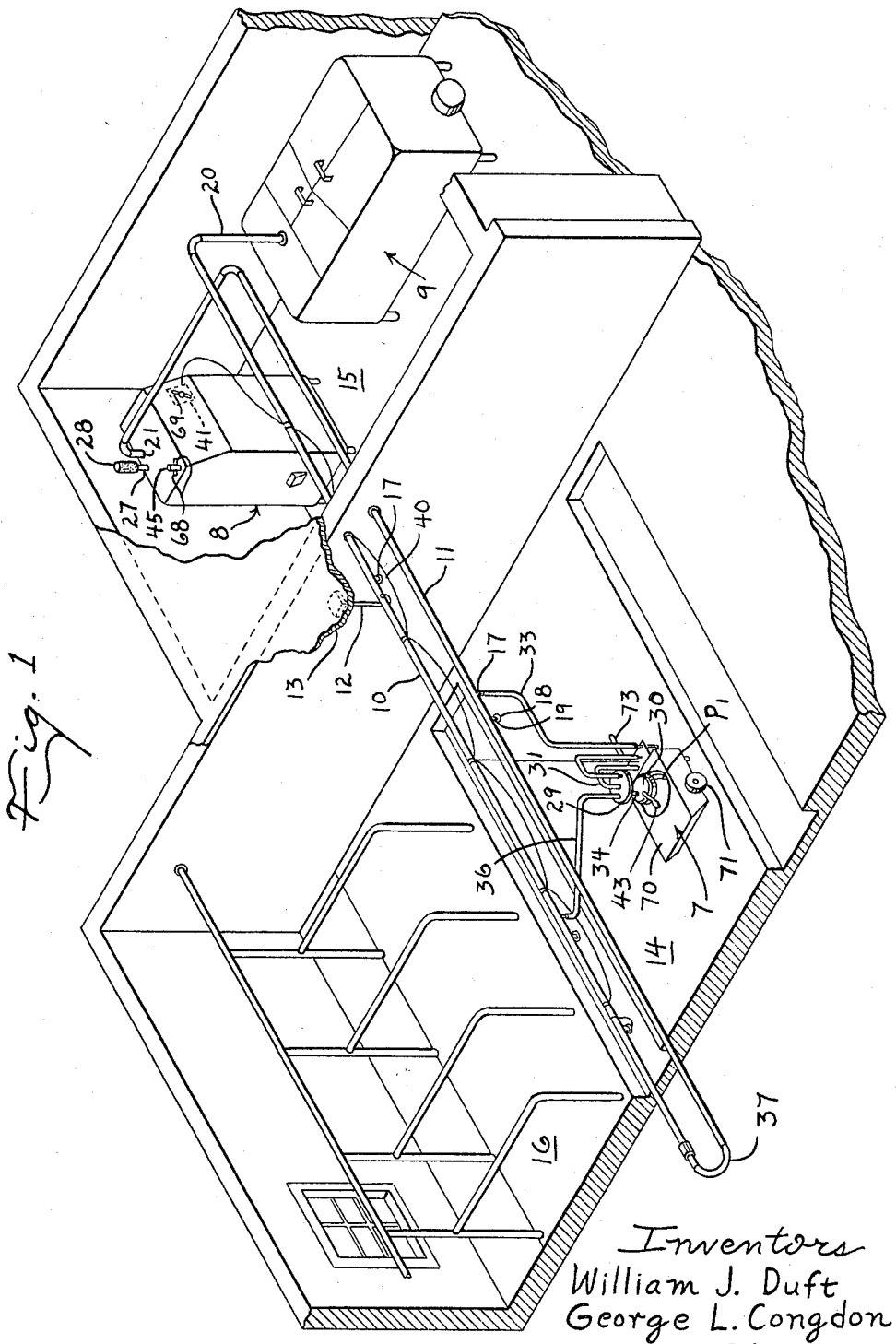

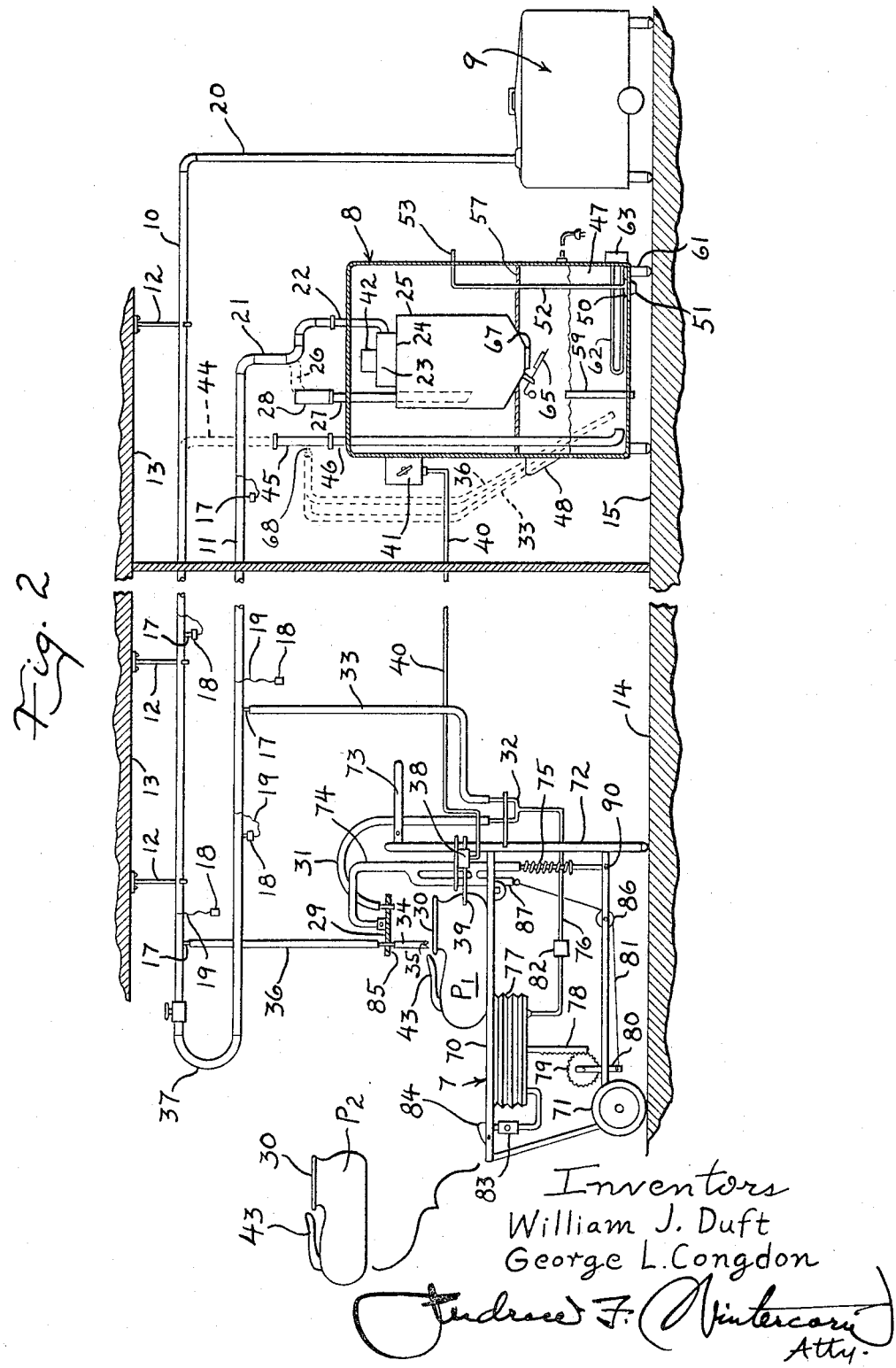

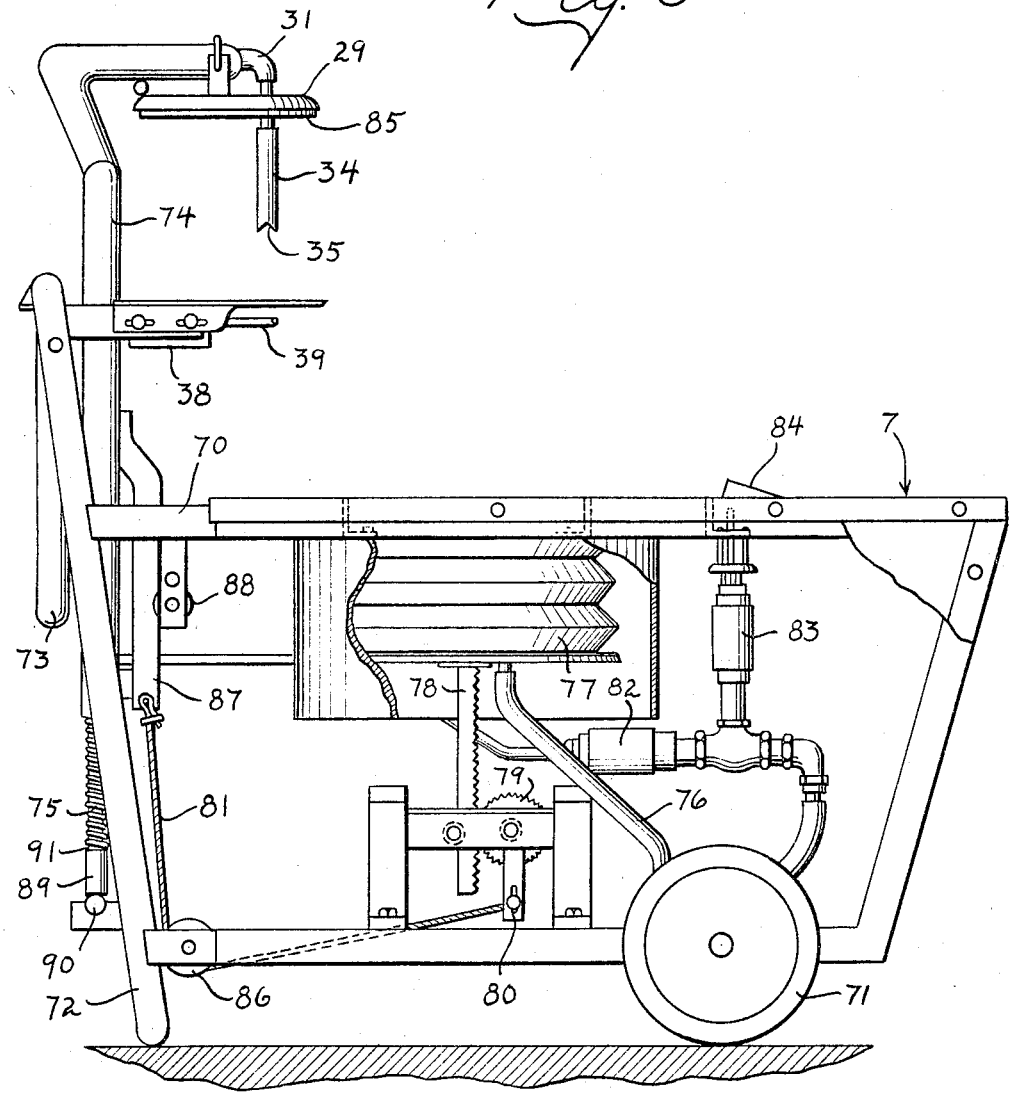

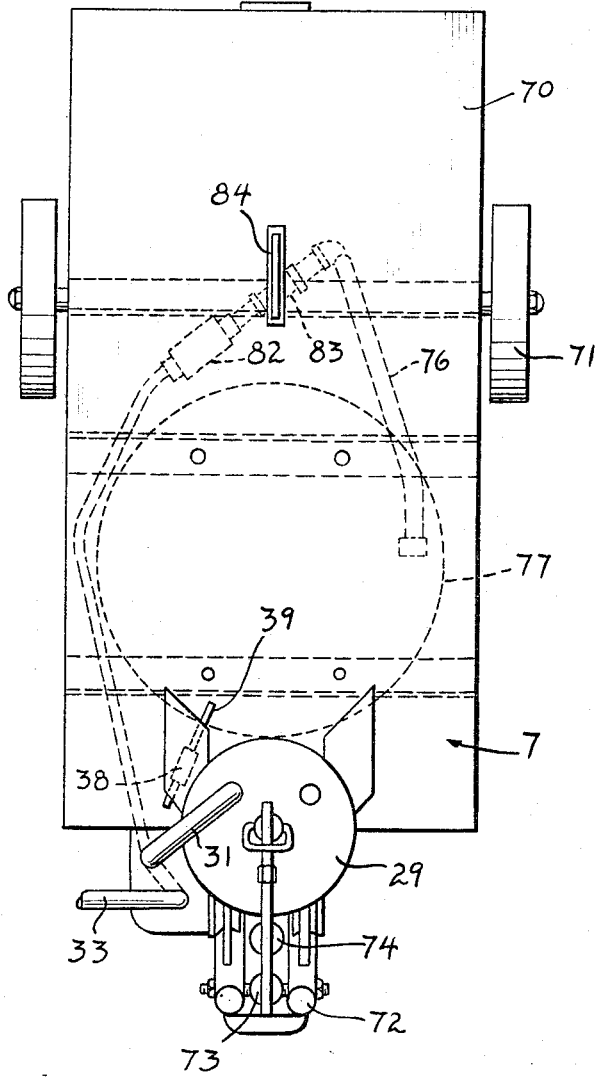

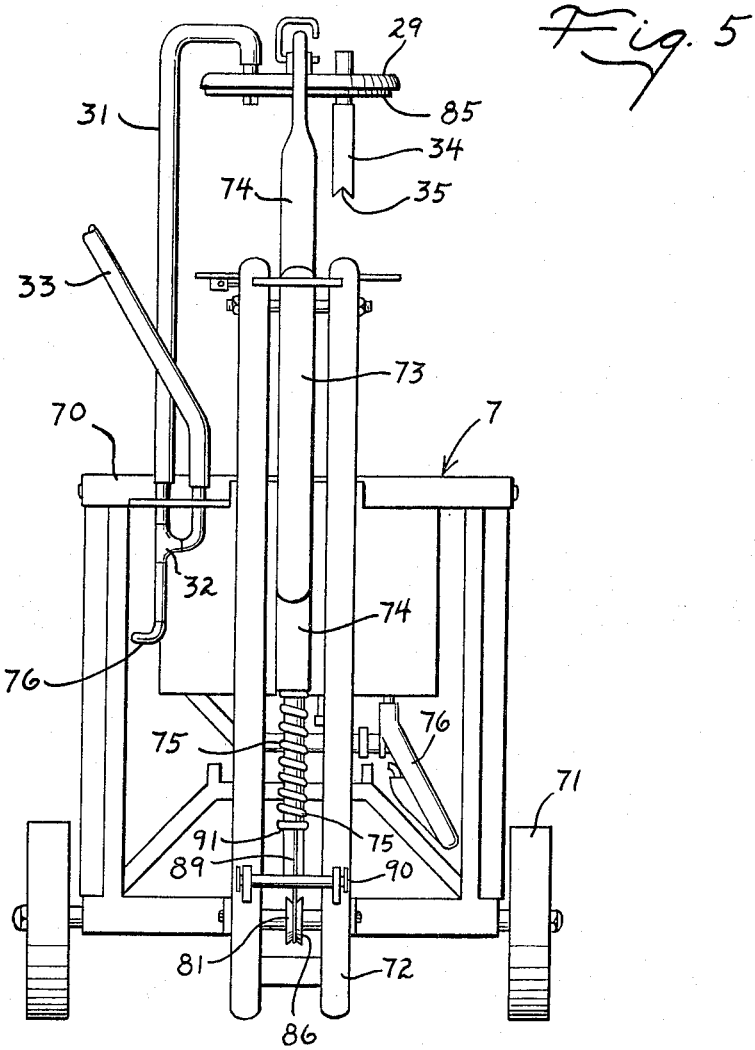

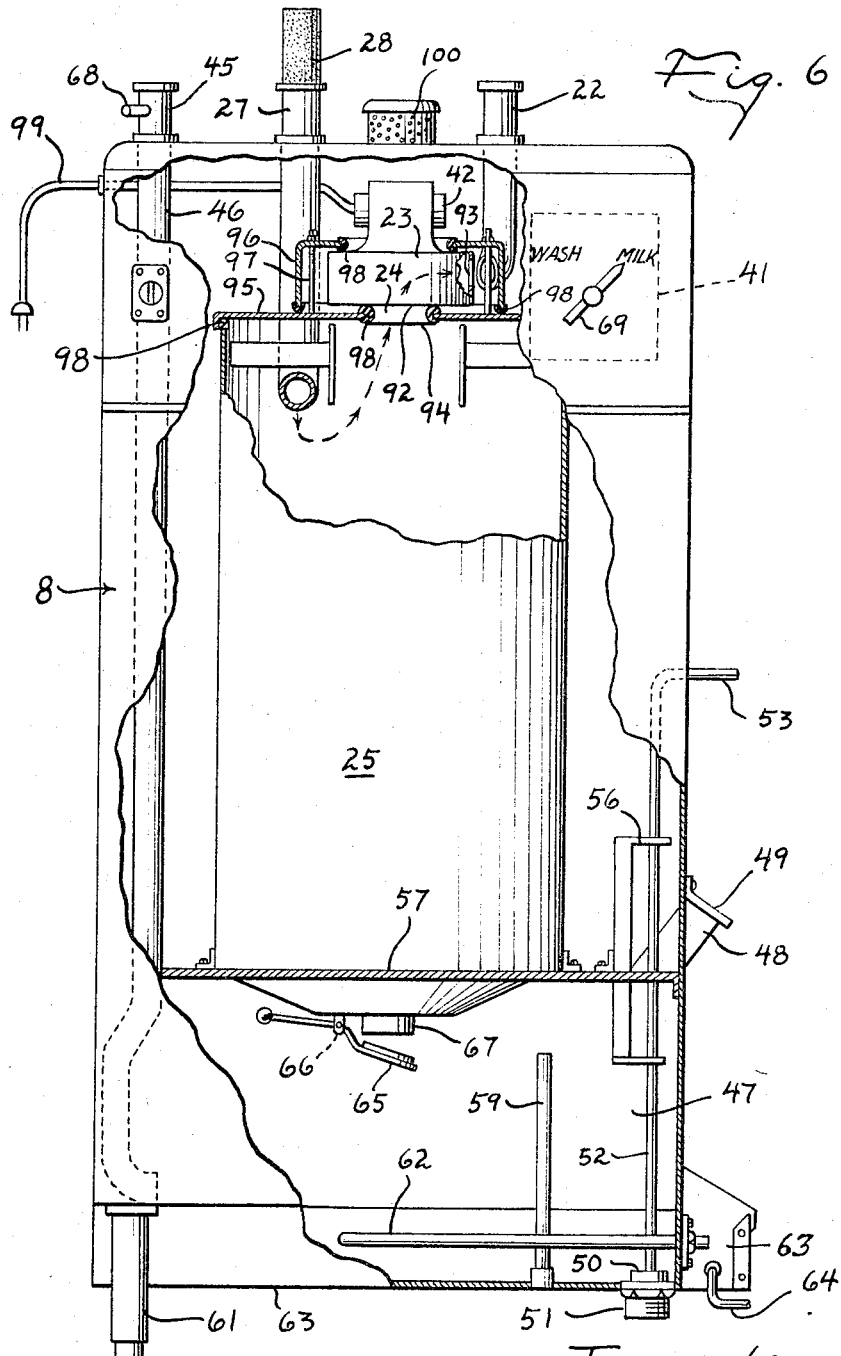

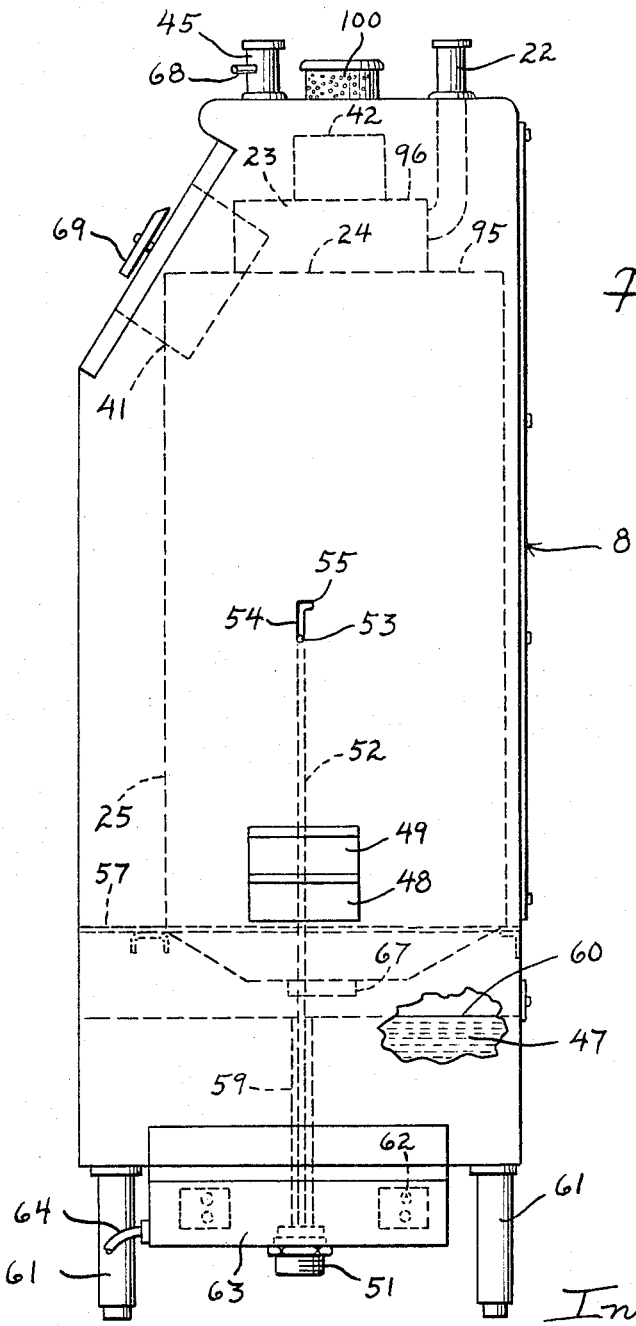

3,285,297
MILK TRANSFER SYSTEM AND APPARATUS
William J. Duft, Lena, Ill., and George L. Congdon, Fort Atkinson, Wis., assignors to Milk-Line Corp., Lena, Ill., a corporation of Illinois
Filed Aug. 31, 1964, Ser. No. 393,438
20 Claims. (Cl. 141—54)

This invention relates to a new and improved milk transfer system and apparatus, the system working with positive air pressure using compressed air delivered from the exhaust of a centrifugal blowers stationed in the milk room or somewhere remote from the cow barn, so that the milk will be exposed to an absolute minimum of contamination, the transfer of milk from the barn to the milk tank being through sanitary overhead piping, and the suction side of the same centrifugal blower being utilized afterward in the washing cycle, first to draw a predetermined amount of cold water through the overhead piping following by a predetermined amount of hot water containing a suitable detergent to keep the bacteria count down to a minimum. Thus, the system meets all of the requirements as to sanitation for grade A milk suppliers, while at the same time lightening the work for the farmer and enabling him to milk a greater number of cows daily in less time and with far less fatigue than heretofore.

Important adjuncts for the system are the following apparatus, all of novel design and construction:

(1) A portable cart from which extend a flexible plastic milk conduit connectible with one of two parallel overhead pipes that leads to the bulk tank, and another flexible plastic air conduit connectible to the other of said overhead pipes that extends from the air pump in the control cabinet in the milk room, the ends of said pipes remote from the bulk tank and control cabinet being connected, whereby a milk pail placed on the cart is adapted to have the milk forced out of it under air pressure from the second mentioned pipe to flow through the first mentioned pipe to the bulk tank, the cart having a milk pail cover mounted thereon and movable automatically by suitable mechanism into sealing relation with the mouth of the milk pail by operation of a bellows expanded under air pressure to work the aforesaid mechanism in one direction against the action of a coiled lift spring carried on the cart, the placing of the milk pail in the proper position on the cart automatically actuating an air pump switch and timer to start a motor driving the air pump to keep it running for a predetermined interval long enough to insure complete drainage of milk from the pail, but the cover remaining in place on the empty pail until the farmer in placing another pail containing milk on the cart actuates an exhaust valve connected with the bellows, thereby permitting the spring to retract the cover so that the empty milk pail can be removed and the other milk pail placed in position to start the next milk transfer cycle.

(2) A control cabinet located in the milk room or other place remote from the cow barn has a swingable connection for connecting the second mentioned overhead pipe selectively with either the discharge side of the air pump for milk transfer or with the suction side of said air pump for the wash cycle, the pump being on top of a suction tank in the control cabinet the bottom of which opens into a lower tank through a flap valve that automatically closes with inrush of air when the air pump starts on the wash cycle, there being another pipe extending upwardly from the lower tank and connectible with the first mentioned overhead pipe for delivery of the cold rinse water or hot wash water from the lower tank to the overhead pipe in the wash cycle, the timed operation of the motor driving the air pump again, timing the run so that there is little or no unnecessary use of the drive motor in the rinsing, washing and air drying portions of the wash cycle, suitable detergent in accurately measured amount being used in the hot water to insure leaving the overhead piping in sanitary condition ready for the next milking.

The invention is illustrated in the accompanying drawings, in which—

FIG. 1 is a diagrammatic perspective view of a cow barn and adjoining milk house equipped with a milk transfer system and apparatus made in accordance with our invention;

FIG. 2 is a side view of the milk cart and control cabinet on a larger scale showing the connections therebetween and with the bulk tank, all still more or less diagrammatically;

FIGS. 3, 4 and 5 are, respectively, a side view, top view and front end view of the milk cart of our invention, and FIG. 6 is a vertical section through the control cabinet of our invention, a side view of it being shown in FIG. 6a.

The same reference numerals are applied to corresponding parts throughout the views.

Referring first to FIGS. 1 and 2 mainly, the reference numeral 7 designates the cart generally, 8 the control cabinet generally, 9 the bulk tank, and 10 and 11 the two flights of overhead glass piping suitably suspended, as at 12, from the ceiling 13 of the cow barn 14 and adjoining milk house 15, the cart 7 being used in the cow barn 14, starting usually at one end of the aisle between the stalls 16 and moving in steps toward the other end, always clear of the cows. There are depending nipples 17 provided in longitudinally spaced relation on both pipes 10 and 11 having tight fitting removable caps 18 normally sealing these nipples and covering them for protection but adapted to hang from the pipes on flexible chains 19 when removed so as to be readily available for replacement. One end of pipe 10 is connected, as shown at 20, with the bulk tank 9, and the corresponding end of pipe 11 is connected, as shown at 21, either with the outlet 22 of the air pump 23, communicating as shown at 24 with the top of the suction tank 25, or, as indicated in dotted lines in FIG. 2 at 26, with the pipe 27. This pipe extends upwardly from the suction tank 25 from the top of control cabinet 8, and, when not connected with pipe 21, has fitted on the upper end thereof an air filter 28. Thus, the pipe 11 during the milk cycle is adapted to have compressed air supplied thereto from air pump 23 to force milk out of the milk pail $P_1$ placed on the top of cart 7 with cover 29 pressed in sealing engagement with the mouth 30 of the pail, the air entering the pail through the flexible conduit 31 that communicates with cover 29 and through a Y-tube 32 and another flexible conduit 33 with the pipe 11, while a milk discharge conduit 34 that extends downwardly from the cover 29 into contact with the bottom of the pail and is notched at its lower end, as at 35, to insure good flow of milk from the pail until there is no more milk left in the pail has connection through a flexible conduit 36 with the other pipe 10, the pipes 10 and 11 being interconnected as shown at 37 at their ends remote from the cabinet 8 and tank 9. An electric switch 38 that is automatically closed by forward movement of the pin 39 in the positioning of the pail $P_1$ on the cart is electrically connected by a low voltage line 40 with a milk/wash control switch/timer 41, which in turn is connected with and controls the electric motor 42 driving the air pump 23, the timer mechanism in unit 41 allowing the motor 42 to operate only a predetermined length of time upon each starting thereof during the milking cycle, sufficient to empty a pail, so that the operator seeing milk flowing through the pipe 10, that is preferably of clear glass, largely for this purpose, will not remove the pail $P_1$ too soon and place another full milk pail $P_2$ on the cart 7. There is usually no waiting necessary, because by the time a second pail $P_2$ is filled, the first pail $P_1$ has been emptied. In fact, it takes so little time to empty a pail that three or four pails can be kept in use at all times, one on the cart being emptied while the others are suspended on cows during milking. The handle 43 on the pails provides a convenient place to attach the ends of a flexible and adjustable length sling (not shown) extending over the back of the cow, while of course the mouth 30 of the pail during milking has the usual cover (not shown) attached thereto to which the teat cups for the milking machine are connected. The use of compressed clean air from the milk house 15, filtered through the filter 28, insures good sanitation despite the fact that the cart 7 for convenience must be placed in the cow barn 14 not very far from the cows. Authorities on the subject agree that there is much less likelihood of any deleterious effect upon milk when it is transferred under clean air pressure through clean overhead piping in this way as compared with pumping it by suction, the method so commonly used heretofore. We therefore use suction only in the washing cycle, where suction can have no harmful effect, while still having the milk line 10–11 open only to the milk house 15 to reduce to a minimum any likelihood of contamination.

In the wash cycle, the flexible conduits 33 and 36 are disconnected from the nipples 17 on overhead pipes 10 and 11 and these nipples are then sealed by means of caps 18. The pipes 20 and 21 are disconnected from the positions shown in FIG. 2 for the milking cycle. Pipe 20, instead of communcating with the bulk milk tank 9 as in milking, is connected, as shown in dotted lines at 44 in FIG. 2, to the elbow fitting 45 connected to the upper end of a pipe 46 extending vertically downwardly in cabinet 8 into the bottom compartment 47 of the cabinet reserved for wash water and having communicating with the top thereof a filler neck 48 with hinged cover 49, which enables pouring first cold rinse water into the compartment 47 and thereafter hot wash water with and without detergent and finally rinse water with or without a sanitizing agent. The compartment 47 is emptyable by means of a stopper 50 in the bottom drain fitting 51, operable by hand by means of a vertical rod 52 at its upper handle end 53 that extends through a bayonet slot 54 provided in the side wall of the cabinet 8, permitting locking of the stopper 50 in a raised open position when the handle 53 is engaged in the offset upper end 55 of the slot 54 shown in FIG. 6a. A bracket 56 provides guides in vertically spaced relation for the rod 52, this bracket being provided on the horizontal support 57 in the lower portion of the cabinet 8 on which the vacuum tank 25 is mounted. An overflow pipe 59 predetermines the level for the wash water in compartment 47 as indicated at 60 in FIG. 6a. The cabinet 8 is supported on legs 61 in elevated relation to the floor, and electric heating elements 62 are provided under the bottom of it extending horizontally from a junction box 63 and adapted to be connected to a 220 volt electrical service line by means of a cable 64, whereby to heat the water in compartment 47 to a desired high temperature for most efficient and sanitary cleansing of the milk line 10–11 in the washing cycle. The vacuum tank 25 has a counter-balanced flapper valve 65 pivoted, as indicated at 66, relative to the bottom of the tank and adjacent neck 67 and, when there is no suction in the tank 25, this valve is disposed in the nearly closed position shown in FIGS. 2 and 6 but immediately upon a sufficient reduction in pressure in the tank 25 this valve closes to seal the tank and thus retain wash water drawn into it and allow building up sufficient suction in the tank to draw wash water from the compartment 47 through pipe 46 and polyethylene pipe connection 44 into line 10 to clean it first with cold rinse water, the rinse water finally passing from line 10 through line 11 back to the vacuum tank 25. This washing or rinsing with cold water continues until all of the water placed in compartment 47 has been used up, at which time the timer 41 shuts off the motor 42 and pump 23 and flap valve 65 opens allowing the water to flow back into compartment 47 from whence it can be quickly drained by the operator opening the stopper 50. During the rinsing with cold water a certain amount of wash water and air is drawn in at the elbow 45 through tubes 33 and 36 removed from cart 7 and connected to the nipples 67 on the elbow 45 and having their lower ends extended downwardly into compartment 47. In this way these tubes are washed with pipes 10 and 11 and the air entrained with the water helps to do a better job of rinsing and washing the milk line. Following the cold water rinse, water at a temperature of about 90° F. is used, followed by another run of water at about 160° F. and that is followed by another run of cold water with or without addition of a sanitizing agent in this rinse. This leaves the milk line 10–11 in a clean sanitary condition, especially if the pump 23 is allowed to run for a while after the last rinse to clear out rinse water and get the walls of the line 10–11 dried more or less with clean air from the milk house 15. In passing, attention is called in FIG. 6 to the hand rotatable pointer 69 which the operator turns to the "milk cycle" or to the "wash cycle" at the beginning of the selected cycle. The timer in switch 41 upon each start in response to movement of pin 39 by a milk pail keeps the motor 42 running a predetermined time, long enough for the emptying of the milk from the pail into the tank 9, and, each time the timer is set for the wash cycle by knob 69 it allows the motor 42 to run again a predetermined length of time suitable for the washing or rinsing operation.

Referring next to FIGS. 3 to 5, the cart 7 has a platform 70 supported on a pair of wheels 71 and a leg 72 to be rolled about by means of a handle 73 that is foldable downwardly when not in use to an out of the way position from its horizontal operative position. The milk pail $P_1$ and $P_2$ is placed on the platform 70 after being filled with milk from the cow and having had the milking machine cover removed from its mouth 30 that is used with the usual milking machine, so that the cover 29 on the cart 7 can be applied to seal the pail preliminary to the transfer of the milk therein under air pressure to the bulk tank 9, as previously described. The cover 29 is movable vertically with a lift-arm 74 that is spring-loaded, as indicated at 75, in an upward direction so as to return upwardly to retracted position when not otherwise forced downwardly under air pressure supplied from the Y-tube 32 through a plastic flexible tube 76 to a rubber bellows 77. The bellows 77 is fixed to the bottom of platform 70 and operates a vertical rack 78 downwardly to turn a gear 79 and thus swing an arm 80 that is attached to it and has its outer end radially adjustably connected to a cable 81 so as to pull downwardly on the lift-arm 74 and force the cover 29 down tight onto the mouth of the milk pail. A check valve 82 traps the compressed air in the bellows 77 to maintain the cover 29 in sealed relation to the milk pail until the operator trips another check valve 83 to exhaust the air by placing another milk pail with milk in it on the trip-lever 84 pivoted with respect to the platform 70 and normally projecting upwardly from it under spring pressure but adapted to be depressed by the pail. In that way the pail that has just been emptied will be automatically uncovered as the lift-arm 74 under action of its spring 75 returns to its raised retracted position, and then the operator can remove the emptied pail and place the filled pail in position for transfer of its contents in the same way as described above, namely, by engagement with the pin 39 so as to operate the air pump switch 38 to start another timed run of the pump 23 by means of motor 42, the timing being obtained by the control switch-timer 41. It is clear when the arm 80 is swung through approximately 90°, as required for operation of the cover 29 from fully retracted to fully engaged position, the arm 80 in the last portion of its movement operates with maximum leverage by reason of the direction of pull of cable 81 with respect to it so that a very tight sealing action is assured without imposing too much load on the bellows 77. The gasket 85 on the bottom of the cover 29 can therefore be compressed to the extent necessary for an air-tight seal. In passing, it will be seen the cable 81 extends under a pulley 86 on the frame of the cart 7 and is fastened to the lower end of a vertical arm 87 secured to the inner side of the lift-arm 74, the arm 87 bearing against a guide pulley 88 suitably mounted on a bracket secured to the bottom of the platform 70. Lift-arm 74 is tubular and is slidably guided on a vertical rod 89 that is pivotally mounted at its lower end, as at 90, on the frame of the cart 7 and supports the lower end of the spring 75 on an annular shoulder 91 for compression by the arm 74 when the latter is pulled downwardly by cable 81 to apply the cover 29 to the milk pail.

Referring again to FIG. 6 the air pump 23 is shown as a vacuum cleaner fan with its intake or suction side at 92 and its discharge or pressure side at 93, the suction opening 92 communicating with the top of the vacuum tank 25 where the pump 23 is mounted over a central opening 94 in the cover plate 95 and is clamped in position on said plate by means of a hold-down ring 96 fastened by means of screws 97 to the cover 95. Gaskets 98 give air-tight joints between the cover 95 and the tank 58 and between the cover 95 and the air pump 23 as well as between the ring 96 and the cover 95 and air pump 23. The motor 42, the circuit through which is controlled by the timer 41, has an extension cord 99 extending from it for connection with an 110 volt electric service line. The perforated vent 100 atop the cabinet 8 is directly over the motor 42 to assure good cooling.

In operation, the farmer runs the cart from place to place in the barn 14 as one after another of the cows in the stalls 16 are being milked, and the milk pails $P_1$–$P_2$ filled with milk are placed one after another on the cart 7 to have them emptied under air pressure from pump 23 into bulk tank 9, the hose connections 33 and 36 being shifted from one set of nipples 17 to another spaced lengthwise of the overhead line 10–11, as the milking progresses. As each pail is placed in position on table 70 switch 38 is closed by plunger 39 to start the cycle timed by the timer 41, the cover 29 being brought down tightly onto the pail to seal the mouth 30 under air pressure admitted to bellows 77, and the cover remaining so engaged until the timer 41 stops the motor 42 after it has operated long enough to empty the pail, whereupon, when the operator places the next pail on the table 70 resting on top of the finger 84 to release the air pressure from bellows 77 the cover 29 is immediately returned to its raised retracted position by means of the spring 75 and everything is in readiness for the emptying of the next pail, the pail just emptied being used again in connection with the milking machine in the usual way for milking another cow. After all of the cows have been milked and all of the milk has been transferred under air pressure to the bulk tank 9 there remains only the matter of washing the pails and the hoses 33 and 36 and washing and thoroughly rinsing the overhead milk line 10–11. Clean pure air is used during the milking cycle, only air from the milk house 15 being drawn through the pipe 27 after passing through the filter 28, and this air being discharged under pressure through pipe 22 and pipe connection 21 to line 11. In the washing cycle, when the line 10 is connected by means of a polyethylene tube 44 with pipe 46 to draw wash water or rinse water from compartment 47 in cabinet 8 into suction tank 25, line 11 is connected by another polyethylene tube 26 to pipe 27, the filter 28 having been removed to permit such connection. The amount of cold rinse water can, of course, be predetermined either in the emptying of it into compartment 47 or by filling up to the level of the overflow pipe 59, whichever is most convenient. Of course, the air pump 23 will be operated only so long as the motor 42 is operated, and the latter is timed by the timer 41, so the operator does not have to stand by during each step of the wash cycle but can attend to other chores and can take care of each succeeding step of the wash cycle as it is convenient for him to do so. Following the cold rinse there are runs of hot and hotter wash solutions, one with detergent, in order to insure thoroughly cleaning the milk line 10–11, and finally there is a cold rinse with or without a sanitizing agent, followed by the flowing of clean air through the line to clear it of any remaining water and more or less dry it out. Thus the line is left in readiness for the next milking and there is every assurance that the line contains no harmful bacteria. Such milk transfer systems as here described have received unqualified approval of inspectors, and farmers having such systems have been privileged to receive the highest prices for their milk.

It is believed the foregoing description conveys a good understanding of the objects and advantages of my invention. The appended claims have been drawn to cover all legitimate modifications and adaptations.

We claim:

1. In a system wherein milk may be flushed by compressed air from conventional type milk pails, the combination with a pair of substantially parallel elevated pipe lines, the first pipe being adapted to deliver milk into a bulk tank for storage and cooling, the second pipe being adapted to deliver compressed air to the first pipe, both pipes having normally closed nipples communicating therewith and projecting therefrom at longitudinally spaced intervals, a portable carrier movable along a floor under said pipe lines and on which milk pails may be placed for support during milk transfer therefrom through said first pipe to the bulk tank, a closure mounted on and operable to and fro relative to said carrier adapted to fit interchangeably atop and temporarily close each of a plurality of milk pails placed in succession on said carrier for milk transfer therefrom, means for operating said closure relative to said carrier to and from closed position on a milk pail, an air hose connected to and extending from said closure for communication at one end with the inside of a milk pail at the top thereof and detachably connectible at the other end with a selected nipple on the second pipe, a milk discharging conduit connected with said closure and adapted to depend therefrom into a milk pail to the bottom thereof, a milk hose connected at one end with said closure in communication with said milk discharging conduit and detachably connectible at its other end with a selected nipple on the first pipe, means for supplying compressed air, and manually controlled means on said carrier for setting into operation said means for supplying compressed air to said second pipe long enough to displace the milk from a milk pail into the bulk tank.

2. A system as set forth in claim 1, including automatic time control means for shutting off the compressed air means after operating a predetermined length of time on each start.

3. A system as set forth in claim 1, wherein the means for operating said closure comprises spring means tending to open said closure and move it to a retracted position relative to a milk pail, and means operable by compressed air supplied through said second pipe to close said closure on a milk pail against the action of said spring means.

4. A system as set forth in claim 1, wherein the means for operating said closure comprises spring means tending to open said closure and move it to a retracted position relative to a milk pail, and means operable by compressed air supplied through said second pipe to close said closure on a milk pail against the action of said spring means, the last named means having its operation initiated by the operation of the manually controlled means on said carrier for setting into operation the remotely located means for temporarily supplying compressed air to said second pipe.

5. A system as set forth in claim 1, wherein the means for operating said closure comprises spring means tending to open said closure and move it to a retracted position relative to a milk pail, and means operable by compressed air supplied through said second pipe to close said closure on a milk pail against the action of said spring means, the last named means having its operation initiated by the operation of the manually controlled means on said carrier for setting into operation the remotely located means for temporarily supplying compressed air to said second pipe, the system including a check valve for automatically retaining compressed air in the means operable by compressed air to close said closure on a milk pail, whereby to keep the milk pail sealed until it is to be removed and replaced by another pail containing milk, and manually operable means for releasing the pressure so as to allow the closure to open.

6. A system as set forth in claim 1, wherein the means for operating said closure comprises spring means tending to open said closure and move it to a retracted position relative to a milk pail, and means operable by compressed air supplied through said second pipe to close said closure on a milk pail against the action of said spring means, said means comprising a reciprocable element, a rack reciprocable therewith, a gear rotatable by said rack and having a radius arm extending therefrom, and a cable connected at one end with said arm and arranged to be pulled to transmit movement to said closure, said cable being guided so that the arm swings toward dead-center alignment with the cable for maximum mechanical advantage.

7. In a system wherein milk may be flushed by compressed air from conventional type milk pails, the combination with a pair of substantially parallel elevated pipe lines, the first pipe being adapted to deliver milk into a bulk tank for storage and cooling, the second pipe being adapted to deliver compressed air to the first pipe, both pipes having normally closed nipples communicating therewith and projecting therefrom at longitudinally spaced intervals, a closure to fit interchangeably atop and temporarily close each of a plurality of milk pails for milk transfer therefrom, an air hose connected to and extending from said closure for communication at one end with the inside of a milk pail at the top thereof and detachably connectible at the other end with a selected nipple on the second pipe, a milk discharging conduit connected with said closure and adapted to depend therefrom into a milk pail to the bottom thereof, a milk hose connected at one end with said closure in communication with said conduit and detachably connectible at its other end with a selected nipple on the first pipe, a centrifugal air pump having a suction intake on one side and a pressure outlet on the opposite side, an electric motor for driving said pump, a suction tank with the top of which the suction intake of said pump communicates, a third pipe extending into the top of said suction tank to deliver air to the suction intake of said air pump, a fourth pipe extending from said pressure outlet, conduit means for detachably connecting the outer end of said fourth pipe with said second pipe during milk transfer from a milk pail to the bulk tank, a wash solution compartment under said suction tank and normally communicating with the bottom thereof, said compartment having a filler opening and an openable bottom drain, a flapper valve for automatically closing off communication between said compartment and the bottom of said tank in response to reduction in pressure in said tank, a fifth pipe communicating with the bottom of the wash solution compartment, conduit means for detachably connecting the outer end of said fifth pipe with said first pipe during the wash cycle when wash solution is drawn by suction in said suction tank through said first and second pipes into said suction tank, a source of electric current supply, and manually controlled means for connecting said electric motor for a time interval with said source of electric current supply during the milking cycle and washing cycle, the air pump operating to furnish compressed air for moving milk during milk transfer from a milk pail to the bulk tank and to furnish suction for moving wash solution through the first and second pipes during the wash cycle.

8. A system as set forth in claim 7, including automatic time control means for shutting off said electric motor after a predetermined length of time on each start.

9. A system as set forth in claim 7, including means for entraining air with the wash water during the wash cycle.

10. A system as set forth in claim 7, including an air filter detachably mounted on the outer end of said third pipe.

11. A system as set forth in claim 7, including a portable carrier for milk pails movable along a floor under said pipe lines, said closure being mounted on and operable relative to said carrier to and from closed position, means for operating said closure, and manually controlled means on said carrier for remote control of said electric motor.

12. A system as set forth in claim 7, including a portable carrier for milk pails movable along a floor under said pipe lines, said closure being mounted on and operable relative to said carrier to and from closed position, spring means tending to open said closure and move it to a retracted position relative to a milk pail, and means operable by compressed air supplied through said second pipe to close said closure on a milk pail against the action of said spring means.

13. A system as set forth in claim 7, including a portable carrier for milk pails movable along a floor under said pipe lines, said closure being mounted on and operable relative to said carrier to and from closed position, spring means tending to open said closure and move it to a retracted position relative to a milk pail, and means operable by compressed air supplied through said second pipe to close said closure on a milk pail against the action of said spring means, the last named means having its operation initiated by the operation of the manually controlled means on said carrier for remote control of said electric motor.

14. A portable carrier cart for milk pails comprising a horizontal platform on a portable support, a vertically reciprocable lift-arm guided for movement on said platform, spring means urging said lift-arm upwardly to a retracted position, a milk pail closure carried on said lift-arm for movement downwardly therewith onto a pail to close it, and a reciprocable element operable under said platform by means of compressed air to operate said lift-arm downwardly against the action of said spring means.

15. A portable milk pail carrier cart as set forth in claim 14, including a rack reciprocable with said reciprocable element, a gear turned by said rack carrying a radius arm, and a cable connected at one end to the outer end of said radius arm and extending over guide pulleys to the lift-arm to transmit a downward pull on said arm.

16. A portable milk pail carrier cart as set forth in claim 14, including a check valve for retaining compressed air to hold said lift-arm down, and manually operable means for releasing the air pressure when the closure is to be opened.

17. A control cabinet of the character described comprising a suction tank having openings at top and bottom, a wash solution compartment below and communicating with the open bottom of said tank, said compartment having a filler opening and an openable bottom drain, a flapper valve arranged to close said bottom opening in response to suction in said tank, a centrifugal blower atop said tank with its suction opening in communication with the top opening, an air discharge pipe extending from the discharge opening of said blower, an air intake pipe extending into the upper end of said tank, and a wash solution discharge pipe extending from the bottom of said wash solution compartment.

18. A control cabinet as set forth in claim 17, including an air filter detachably connected to the outer end of said air intake pipe.

19. A control cabinet as set forth in claim 17, including an air entraining inlet opening provided in said wash solution discharge pipe.

20. A control cabinet as set forth in claim 17, including at least one nipple on the wash solution discharge pipe onto which a flexible hose requiring washing can be attached and extended into the wash solution compartment.

References Cited by the Examiner
UNITED STATES PATENTS

| | | | |
|---|---|---|---|
| 2,865,391 | 12/1958 | Duncan | 137—205 |
| 3,016,877 | 1/1962 | Sparr | 119—14.03 |
| 3,211,171 | 2/1963 | Kinsey | 137—205 X |

LAVERNE D. GEIGER, *Primary Examiner.*

H. BELL, *Examiner.*